(12) United States Patent
Jogadhenu et al.

(10) Patent No.: US 9,398,119 B2
(45) Date of Patent: Jul. 19, 2016

(54) DETECTION OF RVU CAPABLE DEVICES

(71) Applicant: Entropic Communications, Inc., San Diego, CA (US)

(72) Inventors: Sagar Jogadhenu, San Diego, CA (US); Zhifeng Hu, Shenzhen (CN); Guohua Li, Shenzhen (CN)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 225 days.

(21) Appl. No.: 14/084,278

(22) Filed: Nov. 19, 2013

(65) Prior Publication Data

US 2015/0138997 A1    May 21, 2015

(51) Int. Cl.
  *G01R 31/08*    (2006.01)
  *H04L 29/06*    (2006.01)
  *H04L 12/26*    (2006.01)
  *H04L 29/08*    (2006.01)

(52) U.S. Cl.
  CPC .............. *H04L 69/22* (2013.01); *H04L 43/50* (2013.01); *H04L 67/16* (2013.01); *H04L 69/24* (2013.01)

(58) Field of Classification Search
  CPC ................................ H04L 69/00; H04L 69/22
  USPC ........................................................ 370/252
  See application file for complete search history.

(56) References Cited

U.S. PATENT DOCUMENTS

| | | | | |
|---|---|---|---|---|
| 2009/0094317 A1* | 4/2009 | Venkitaraman | ... | H04L 29/12311 709/203 |
| 2009/0177896 A1* | 7/2009 | Ito | ............ | H04L 12/10 713/300 |
| 2011/0296030 A1* | 12/2011 | Gaxiola | .............. | H04L 12/2814 709/227 |
| 2012/0011557 A1* | 1/2012 | Mathews | ......... | H04N 21/25833 725/131 |
| 2012/0151056 A1* | 6/2012 | Sporel | ..................... | H04L 45/02 709/225 |
| 2012/0226992 A1* | 9/2012 | Clift | ..................... | H04L 67/025 715/740 |
| 2012/0254453 A1* | 10/2012 | Lejeune | .............. | H04L 67/2823 709/230 |
| 2014/0075485 A1* | 3/2014 | Lee | ....................... | G06F 9/4445 725/68 |

* cited by examiner

*Primary Examiner* — Gerald Smarth
(74) *Attorney, Agent, or Firm* — McAndrews, Held & Malloy, Ltd.

(57) ABSTRACT

Devices and methods for quickly and definitively detecting whether or not a device is RVU capable. Aspects of the disclosed method and apparatus make use of the RVU messaging protocol, which include a Discovery phase and a Description phase. In one embodiment, a stand-alone testing device includes functionality that can test for the existence of RVU capability in a network connected device; in another embodiment, a cable/data network interface device may be modified to include such functionality. One detection method exams messages transmitted by a device during a Discovery phase for unique indicia of RVU compliance by the device. Another detection method reads a data structure from a device during a Description phase and looks for unique indicia of RVU compliance by the device. An installation method provides a process for quickly and definitively detecting an RVU compliant device.

17 Claims, 6 Drawing Sheets

DETECTION OF RVU CAPABLE DEVICES

BACKGROUND (1) Technical Field

This disclosure relates to methods and apparatus for detecting connectivity characteristics of electronic devices.

(2) Background

Modern televisions, game consoles and similar devices are increasingly connected to both a source of television signals (e.g., antennas, coaxial cable, satellite TV receivers, etc.) and to a home data network, such as Ethernet or WiFi. One technology that has been developed to further such connectivity is the "RVU" protocol supported by the RVU Alliance, which is intended to solve the problems inherent in viewing live or recorded digital media remotely across a home network. For example, an RVU compliant TV can view music, photos, and video from an RVU compliant media server. The RVU protocol specifically can deal with the passing of broadcast video coming from a multichannel video programming distributor through a residential gateway or dedicated media server to other consumer electronic devices in the home.

As a new technology, few devices are currently RVU compliant. Accordingly, when a service provider such as a satellite television company installs subscriber equipment at a customer's premises, an installer must determine whether or not a device (e.g., a TV) to be connected to a home network is RVU compliant or not, because different connection devices are required for the two cases. In order to keep service costs down, such a determination should be done quickly and definitively.

Accordingly, there is a need for quick and definitive methods and apparatus for detecting whether or not a device is RVU capable. The present disclosure addresses this need.

SUMMARY

The disclosed devices and methods enable quick and definitive detection as to whether or not a device is RVU capable. In one embodiment, a stand-alone testing device includes functionality that can test for the existence of RVU capability in a network connected device such as a TV, game console, or personal computer. In another embodiment, a cable/data network interface (CDNI) device may be modified to include such functionality. Aspects of the disclosed methods and apparatuses make use of the RVU messaging protocol, which include a Discovery phase and a Description phase.

A first general embodiment detects RVU capability during the Discovery phase of the RVU protocol. A testing device is coupled to a device being tested by means of a conventional network interface. The testing device monitors network communications from the device being tested for data packets of a particular type or types. For selected packet types, the testing device examines the contents of the packet to determine whether or not specific and unique content values or other indicia exist indicative of an RVU compliant device. A result is then indicated based on the determined content values or other indicia.

A second general embodiment detects RVU capability during the Description phase of the RVU protocol. A testing device is coupled to the device being tested by means of a conventional network interface. In this embodiment, the testing device is programmed to include Simple Service Discovery Protocol (SSDP) client functionality, and accordingly, the testing device can initiate transmission of data packets. After connection to a device under test, the testing device transmits a data packet to the device to be tested, and then awaits until it receives a responsive packet containing an address of a data structure within the device under test. The testing device then reads the data structure at the indicated address and examines the contents of the data structure to determine whether or not specific and unique content values or other indicia exist indicative of an RVU compliant device. A result is then indicated based on the determined content values or other indicia.

Another aspect of the disclosed methods and apparatuses is an installation process that may be used in conjunction with the Discovery phase or Description phase detection embodiments. An installer connects a testing device that embodies at least one of the Discovery Phase or Description Phase detection methods described above to a network port of a device to be tested. If an RVU compliant device is not detected by the testing device, the installer would attach the tested device to a set-top box which is coupled to a coaxial cable conveying a video signal from a satellite television or a cable television system. If an RVU compliant device is detected by the testing device, the installer would attach the network port of the tested device to an existing data network (e.g., Ethernet or a WiFi adapter) conveying suitable data content, or to a CDNI which is coupled to a coaxial cable conveying data and video streams from an RVU server or the like (e.g., by means of the Multi-media over Coax Alliance standard for transmitting data over coaxial cable).

The details of one or more embodiments of the disclosed methods and apparatuses are set forth in the accompanying drawings and the description below. Other features, objects, and advantages of the disclosed methods and apparatuses will be apparent from the description and drawings, and from the claims.

DESCRIPTION OF THE DRAWINGS

Like reference numbers and designations in the various drawings indicate like elements.

DETAILED DESCRIPTION

Figure 1:
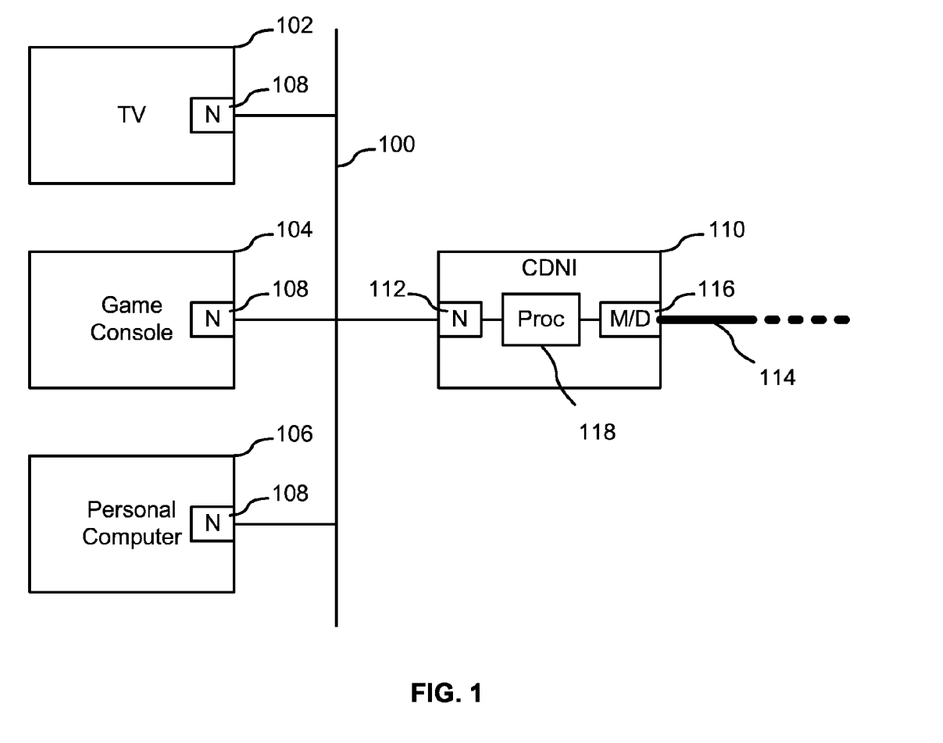
FIG. 1 is a block diagram of typical configuration of home network connected devices capable of receiving television signals.

FIG. 1 is a block diagram of typical configuration of home network connected devices capable of receiving television signals and network data communications. In the illustrated example, a conventional data network 100 provides a communication path for a plurality of connected devices. The data network 100 may be, for example, based on the wired Ethernet or wireless WiFi network standards. Typical devices that may connect to the data network 100 include a television (TV) 102, game console 104, and personal computer 106, each through a conventional network interface 108.

Also connected to the data network 100 in this example is a cable/data network interface (CDNI) 110, by means of a network interface 112. In this example, the CDNI 110 is also connected to a coaxial cable 114 through a modulator/demodulator interface 116 which may be, for example, compliant with the Multimedia over Coax Alliance (MoCA®) standard for transmitting data over coaxial cable. Included within the CDNI 110 is a programmable processor 118, which typically includes a central processing unit, program and data memory and/or storage (which may be volatile and/or non-volatile), and input/output circuitry. A CDNI 110 is a relatively low cost bridge between a typical home data network 100 and a cable-based network system. The CDNI 110 may be powered by an external power supply, or by means of a Universal Serial Bus (USB) connection from another device, or by power supplied over the data network 100 or the coaxial cable 114. One commercial example of a CDNI 110 is a "DIRECTV Ethernet-to-Coax Adapter" available through DIRECTV.

As noted above, one technology that has been developed to further device connectivity for typical home network connected devices is the "RVU" protocol. However, as a new technology, few devices are currently RVU compliant. Accordingly, when a service provider such as a satellite television company installs subscriber equipment at a customer's premises, an installer must determine whether or not a device to be connected to a home network is RVU compliant or not, because different connection devices are required for the two cases.

The disclosed methods and apparatuses enable quick and definitive detection as to whether or not a device is RVU capable. In one embodiment, a stand-alone testing device comprising a processor and data network interface (e.g., Ethernet) includes functionality that can test for the existence of RVU capability in a network connected device such as a TV 102, game console 104, or personal computer 106. In another embodiment, the processor 118 of a CDNI 110 device may be programmed to include such functionality.

One characteristic of the RVU protocol is that it is based on the Universal Plug and Play (UPnP) set of networking protocols that permits networked devices to seamlessly discover each other's presence on a network and establish functional network services for data sharing, communications, and entertainment. UPnP is intended primarily for residential networks without enterprise-class devices. The UPnP protocols include the following capabilities which are also included in the RVU protocol:

Addressing Phase: Each UPnP compliant device must implement a DHCP client and search for a DHCP server when the device is first connected to the network. If no DHCP server is available, the device must assign itself an address.

Discovery Phase: Once a UPnP compliant device has established an IP address, the next step in UPnP networking is discovery. The UPnP discovery protocol is known as the Simple Service Discovery Protocol (SSDP). When a device is added to the network, SSDP allows that device to advertise its services to control points on the network by means of transmitted data packets. Similarly, when a control point is added to the network, SSDP allows that control point to search for devices of interest on the network by means of transmitted data packets. The fundamental exchange in both cases is a discovery message containing a few essential specifics about the device or one of its services, for example, its type, identifier, and a pointer or address to more detailed information.

Description Phase: After a control point has discovered a device, the control point still knows very little about the device. For the control point to learn more about the device and its capabilities, or to interact with the device, the control point must retrieve the device's description using a uniform resource locator (URL) address provided by the device in the discovery phase. The UPnP description for a device is expressed in Extensible Markup Language (XML) and includes vendor-specific manufacturer information like the device model name and number, serial number, manufacturer name, URLs to vendor-specific web sites, etc.

A problem with the RVU protocol is that it does not require an explicit indication that a client device is in fact RVU capable during the Addressing, Discovery and Description phases of the RVU protocol. Aspects of the present disclosed methods and apparatuses provide a solution to this problem.

Detection During Discovery Phase

Figure 2:
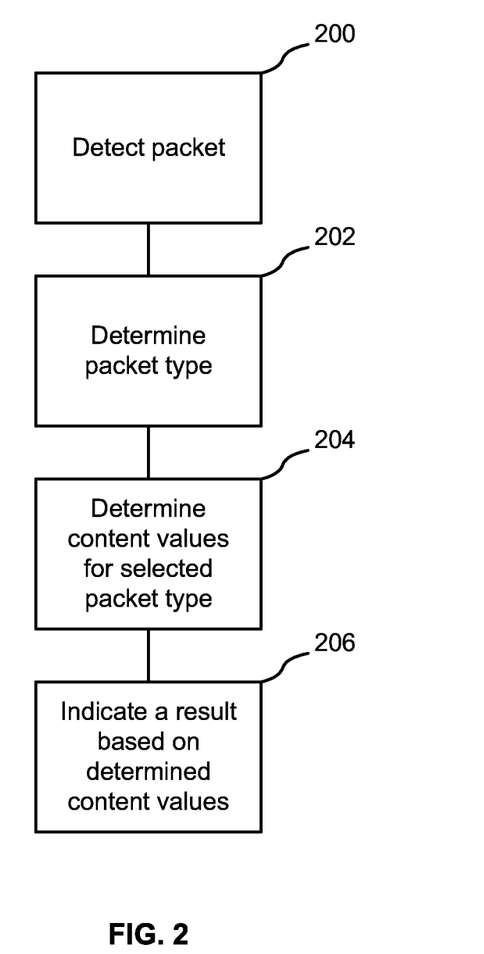
FIG. 2 is a flow chart of a first general embodiment of the present disclosure, for detecting RVU capability during the Discovery phase of the RVU protocol.

FIG. 2 is a flow chart of a first general embodiment of the present disclosure, for detecting RVU capability during the Discovery phase of the RVU protocol. In order to determine whether a particular device is RVU compliant, a testing device is coupled to the device being tested by means of a conventional network interface. The testing device may be a dedicated testing unit with a data network interface (e.g., Ethernet or WiFi) and a programmed processor, or may be a CDNI 110 device that has additional programming to implement testing functionality. The testing device monitors network communications from the device being tested until a data packet is detected (STEP 200). The testing device then determines the packet type (STEP 202). For selected packet types, the testing device examines the contents of the packet to determine whether or not specific and unique content values or other indicia exist (STEP 204) indicative of an RVU compliant device. Such values or other indicia may be, for example, one or more unique character strings (e.g., "RVUServer") or other unique data values contained within the selected packet, or may be one or more unique data structures (e.g., a particular XML data structure). A result is then indicated based on the determined content values or other indicia (STEP 206). For example, if a device being tested is determined to be RVU compliant, the testing device may light or blink an LED, or produce a distinctive sound or beep, or provide a message in a human-readable display (which may be, for example, a display on the device under test), or otherwise provide some indicia of the determination. Conversely, if a device being tested is determined not to be RVU compliant, the testing device may provide some other indicia of the determination (e.g., lighting a red LED to indicate non-compliance, versus lighting a green LED to indicate compliance).

Figure 3:
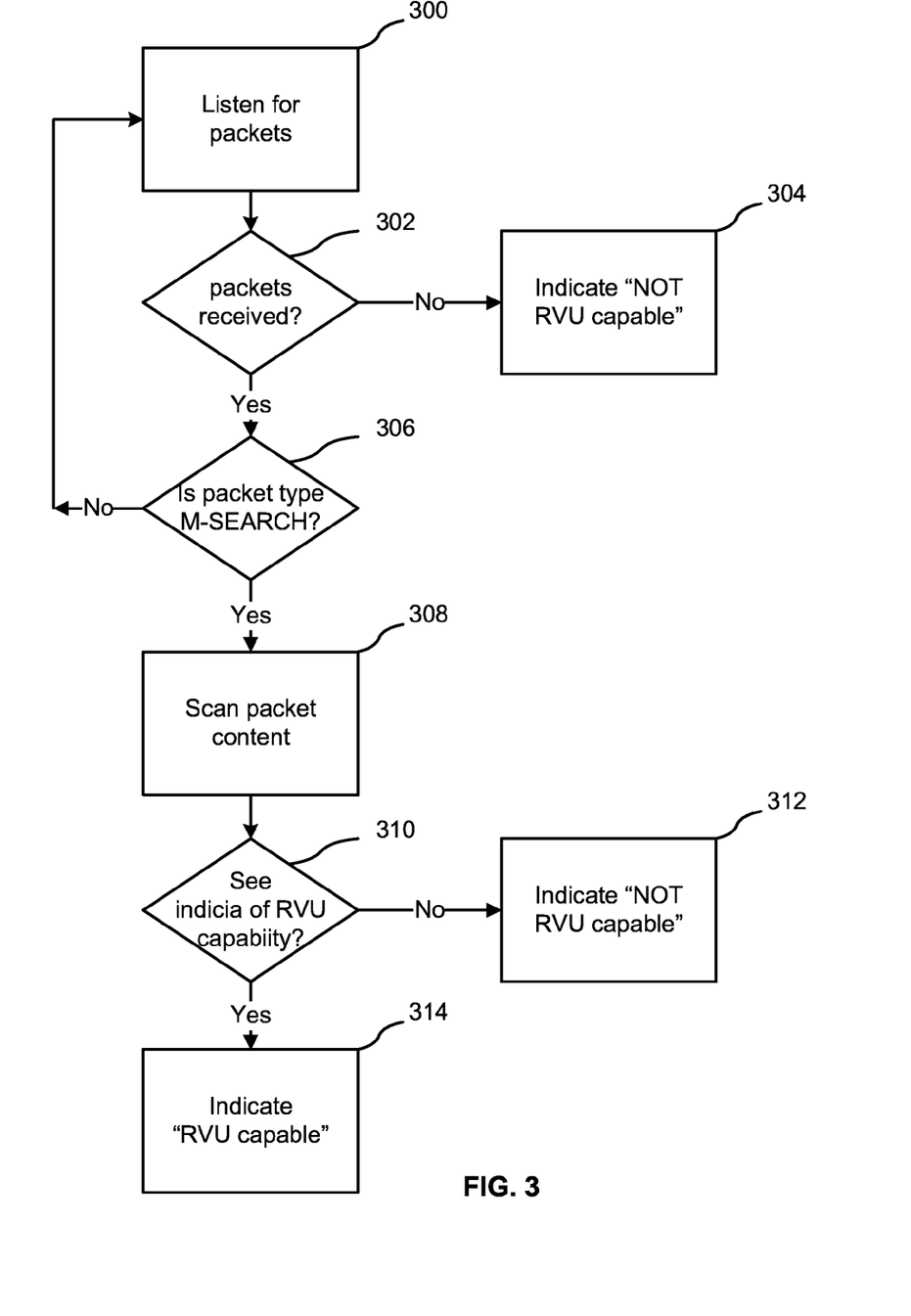
FIG. 3 is a flow chart of a more specific version of the embodiment of the disclosure outlined in FIG. 2.

FIG. 3 is a flow chart of a more specific version of the embodiment of the disclosure outlined in FIG. 2. In order to determine whether a particular device is RVU compliant, a testing device is coupled to the device being tested by means of a conventional network interface. The testing device monitors or "listens to" network communications from the device being tested until a packet is detected (STEP 300). A characteristic of the RVU protocol is that when a network interface of an RVU compliant device is activated (e.g., by plugging in a testing device), the RVU compliant device begins to multicast SSDP M-SEARCH packets. Accordingly, if no packets are received (possibly after some "timeout" period) (STEP 302), then the testing device indicates that the connected device under test is not RVU capable (STEP 304). If packets are received, then the testing device determines if at least one packet is an M-SEARCH type packet (STEP 306); if not, the testing device continues to listen for packets (STEP 300), at least until some timeout or other event occurs that indicates that further listening will likely be fruitless.

If M-SEARCH packets are received (STEP 306), the testing device examines the contents of the message data within the packet to determine whether or not specific and unique content values or other indicia exist indicative of an RVU compliant device (STEP 308). As in FIG. 2, such values or other indicia may be, for example, one or more unique character strings or other unique data values contained within the selected packet, or may be one or more unique data structures. A result is then indicated based on the determined content values or other indicia (STEP 310), either an indication that the device under test is not RVU capable (STEP 312) or that the device is RVU capable (STEP 314). For example, as with the process outlined in FIG. 2, if a device being tested is determined to be RVU compliant, the testing device may light or blink an LED, or produce a distinctive sound or beep, or provide a message in a human-readable display, or otherwise provide some indicia of the determination. Conversely, if a device being tested is determined not to be RVU compliant, the testing device may provide some other indicia of the determination.

Detection During Description Phase

Figure 4:
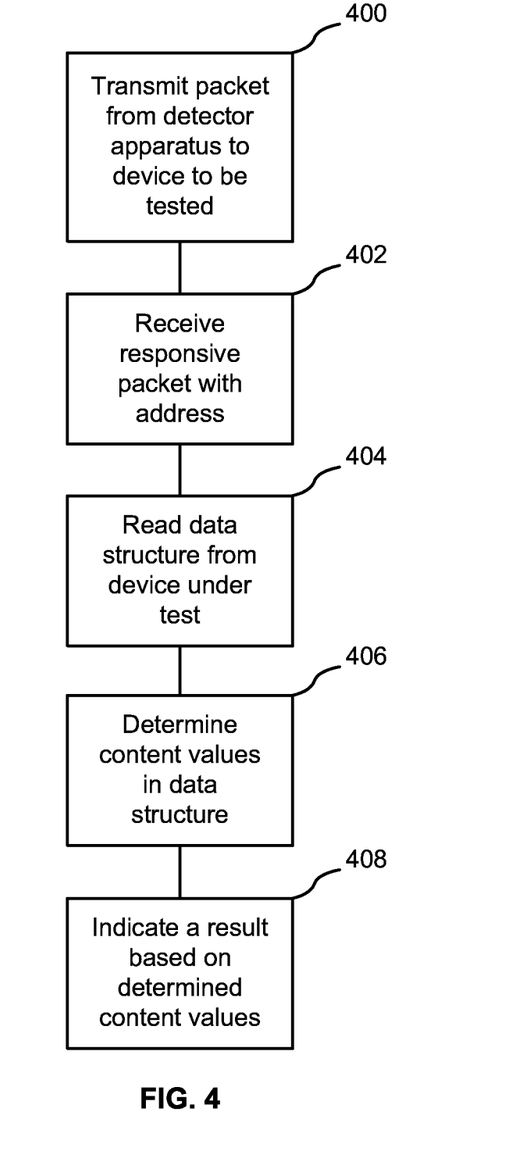
FIG. 4 is a flow chart of a second general embodiment of the present disclosure, for detecting RVU capability during the Description phase of the RVU protocol.

FIG. 4 is a flow chart of a second general embodiment of the present disclosure, for detecting RVU capability during the Description phase of the RVU protocol. In order to determine whether a particular device is RVU compliant, a testing device is coupled to the device being tested by means of a conventional network interface. Again, the testing device may be a dedicated testing unit with a data network interface and a programmed processor, or may be a CDNI 110 device that has additional programming to implement testing functionality.

In this embodiment, the testing device is programmed to include SSDP client functionality, and accordingly, it can initiate transmission data packets. After connection to a device under test, the testing device transmits a data packet to the device to be tested (STEP 400), and then awaits until it receives a responsive packet containing an address of a data structure within the device under test (STEP 402). The testing device then reads the data structure at the indicated address (STEP 404). The testing device then examines the contents of the data structure to determine whether or not specific and unique content values or other indicia exist (STEP 406) indicative of an RVU compliant device. Such values or other indicia may be, for example, one or more unique character strings (e.g., "RVU") or other unique data values contained within the data structure, or may be a unique data structure (e.g., a particular XML data structure), or one or more data fields (e.g., manufacturer name and device model number) or the like which may be compared in the testing device to a lookup table of known RVU devices. A result is then indicated based on the determined content values or other indicia (STEP 408), for example, as described above with respect to FIG. 2.

Figure 5:
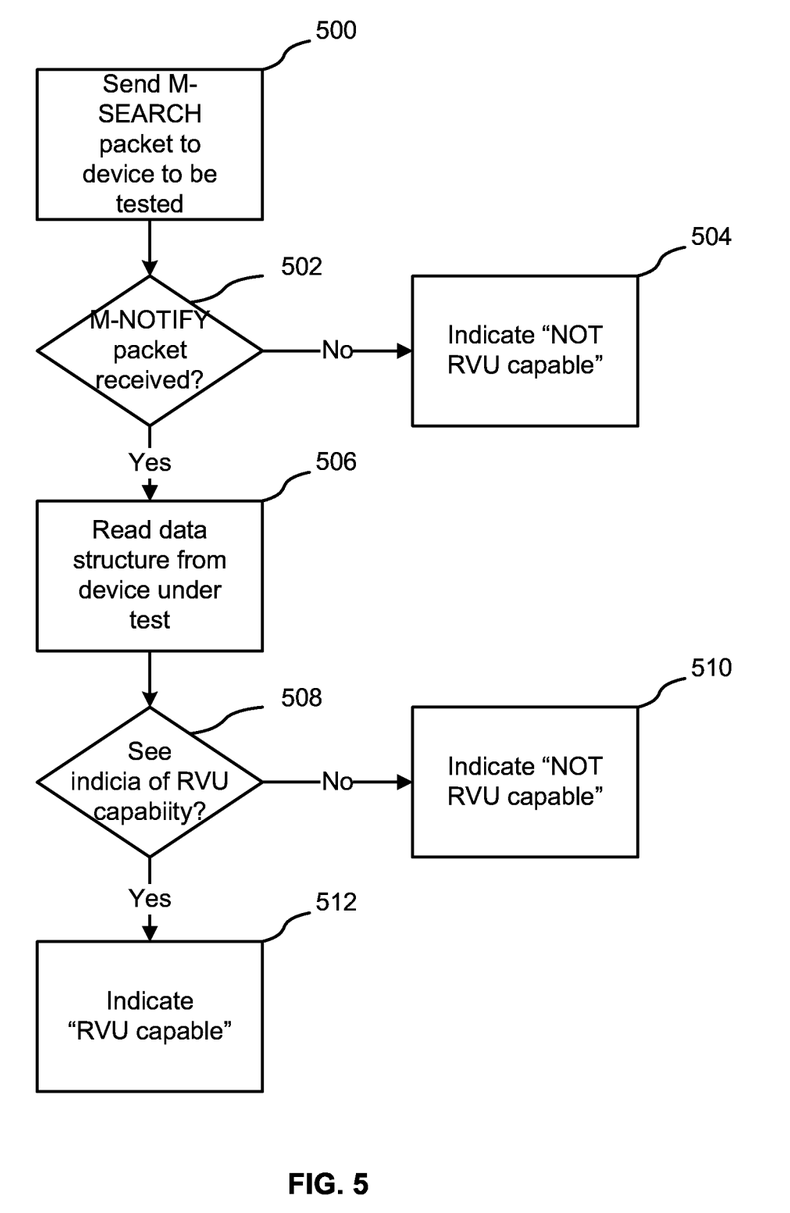
FIG. 5 is a flow chart of a more specific version of the embodiment of the disclosure outlined in FIG. 4.

FIG. 5 is a flow chart of a more specific version of the embodiment of the disclosure outlined in FIG. 4. In order to determine whether a particular device is RVU compliant, a testing device with SSDP client functionality is coupled to the device being tested by means of a conventional network interface. The testing device sends an M-SEARCH data packet to the device to be tested (STEP 500). If the device under test is RVU compliant, it will reply to the M-SEARCH message with an M-NOTIFY data packet, in accordance with the UPnP protocol. Accordingly, if the testing device does not receive back an M-NOTIFY message (STEP 502), it will indicated that the device under test is not RVU capable (STEP 504).

Part of the content of an M-NOTIFY message is a URL to an address within the issuing device at which an XML data structure is stored. The stored data structure generally includes vendor-specific manufacturer information like the device model name and number, serial number, manufacturer name, URLs to vendor-specific web sites, etc. Accordingly, if the testing device does receive back an M-NOTIFY message from the device under test (STEP 502), the testing device will read the data structure at the indicated address, for example, by issuing a conventional Hypertext Transfer Protocol (HTTP) GET request (STEP 506).

The testing device then examines the contents of the data structure to determine whether or not specific and unique content values or other indicia exist (STEP 508) indicative of an RVU compliant device. As noted above, such values or other indicia may be, for example, one or more unique character strings or other unique data values contained within the data structure, or may be a unique data structure. The values or other indicia also may be one or more data fields (e.g., manufacturer name and device model number) or the like which may be compared in the testing device to a lookup table of known RVU devices. A result is then indicated based on the determined content values or other indicia (STEP 508), either an indication that the device under test is not RVU capable (STEP 510) or that the device is RVU capable (STEP 512).

A further aspect of the disclosed methods and apparatuses is that the detection processes described above enable provision of additional functionality. For example, if a determination is made that a device under test is RVU compliant, a testing device comprising a CDNI or similar device also can be programmed to perform additional functions, such as prioritizing certain data traffic over other data traffic (e.g., by allocating more bandwidth to video data and less bandwidth to Internet browser data) or providing other features and functions that will be apparent to those skilled in the art. Accordingly, the disclosed methods and apparatuses are not limited to indicating that a device under test is or is not RVU compliant.

Installation Testing Process

One aspect of the disclosed methods and apparatuses is that they provide a quick and definitive way of determining the RVU compliance of device, such as a TV. As noted above, few devices are currently RVU compliant. If a device is RVU compliant, it can receive RVU compliant commands as well as data and video streams directly through a network connection. Thus, an RVU device may have its data network port directly connected to a compatible network or through an adapter to another network type, such as a coaxial cable (for example, through a MoCA® enabled CDNI 110 as shown in FIG. 1). Notably, residential coaxial cable systems are generally more reliable and prevalent than home network systems, and accordingly coaxial cable connections are often preferred by video service providers.

If a device is not RVU complaint, a conventional set-top box (STB) is used to couple the device through a conventional video interface (e.g., HDMI) to a video source (e.g., a coaxial cable conveying a video signal from a satellite television or a cable television system). As is known in the art, an STB is a video conversion device that generally contains a tuner and connects to a television set and an external source of signal, turning the source signal into a form that can then be displayed on the television screen or other display device. The extra circuitry in STB's makes them more expensive than CDNI's, and thus a service provider has incentive to utilize CDNI's where possible to connect RVU compliant devices to coaxial cabling.

Accordingly, when a service provider such as a satellite television company installs subscriber equipment at a customer's premises, an installer must rapidly determine whether or not a device (e.g., a TV) is RVU compliant or not, because different connection devices are required for the two cases in order to couple through a residential cabling system: either a more expensive STB or a less expensive CDNI.

Figure 6:
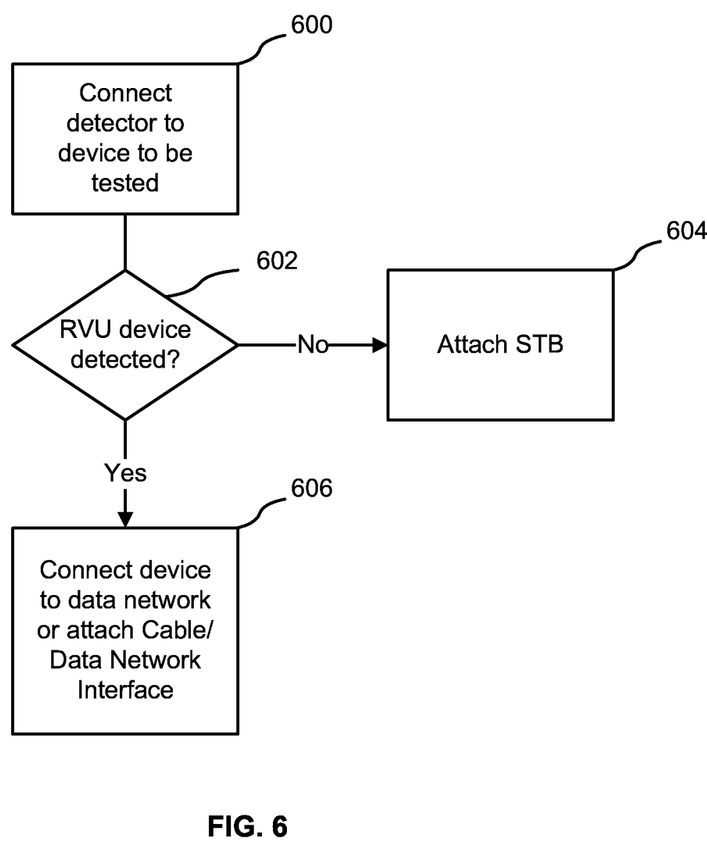
FIG. 6 is a flow chart of an installation process that may be used in conjunction with the testing processes outlined in FIGS. 2-5.

FIG. 6 is a flow chart of an installation process that may be used in conjunction with the testing processes outlined in FIGS. 2-5. An installer connects a testing device that embodies at least one of the Discovery Phase or Description Phase detection methods described above to the network port of a device to be tested (STEP 600). If an RVU compliant device is not detected by the testing device (STEP 602), the installer would attach the device to be tested to an STB or similar device which is coupled to a coaxial cable conveying a video signal from a satellite television or a cable television system (STEP 604). If an RVU compliant device is detected by the testing device (STEP 602), the installer would attach the network port of the device to be tested to an existing data network (e.g., Ethernet or a WiFi adapter) conveying suitable data content, or to a CDNI which is coupled to a coaxial cable conveying data and video streams from an RVU server (e.g., by means of the MoCA standard for transmitting data over coaxial cable) (STEP 606).

Programmed Embodiments

Some or all aspects of the disclosed methods and apparatuses may be implemented in hardware or software, or a combination of both (e.g., programmable logic arrays). Unless otherwise specified, the algorithms included as part of the disclosed methods and apparatuses are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, the disclosed methods and apparatuses may be implemented in one or more computer programs executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program code is applied to input data to perform the functions described herein and generate output information. The output information is applied to one or more output devices, in known fashion.

Each such computer program may be implemented in any desired computer language (including machine, assembly, or high level procedural, logical, or object oriented programming languages) to communicate with a computer system, and may be implemented in a distributed manner in which different parts of the computation specified by the software are performed by different computers. In any case, the language may be a compiled or interpreted language. Computer programs implementing some or all of the disclosed methods and apparatuses may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the disclosed methods and apparatuses have been described. It is to be understood that various modifications may be made without departing from the spirit and scope of the disclosed methods and apparatuses. In particular, the disclosed methods and apparatuses encompass numerous other embodiments of the disclosed methods and apparatuses having equivalent structure and/or function. For example, some of the steps described above may be order independent, and thus can be performed in an order different from that described. As another example, additional steps may be added if desired, such as timeout steps. Accordingly, it is to be understood that the foregoing description is intended to illustrate and not to limit the scope of the disclosed methods and apparatuses, which are defined by the claims presented and the equivalents thereof.

What is claimed is:

1. A method for detecting whether or not a device is RVU capable, including:
    (a) detecting data packets received from a device to be tested;
    (b) determining if any of the received data packets are of a specific type; and
    (c) indicating if at least one received data packet of the specific type contains an indicia of RVU capability.

2. The method of claim 1, wherein the specific type of data packet is an M-SEARCH packet.

3. A method for detecting whether or not a device is RVU capable, including:
    (a) connecting a testing device to a device to be tested, the test device embodying the method of claim 1 detecting whether or not a device is RVU capable;
    (b) connecting a video conversion device to the tested device if the tested device is not RVU capable; and
    (c) connecting a cable/data network interface device to the tested device if the tested device is RVU capable.

4. A test device for detecting whether or not a device is RVU capable, including:
    (a) a network interface configured to be coupled to a device to be tested; and
    (b) a processor programmed to receive data packets from the device to be tested; determine if any of the received data packets are of a specific type; and indicate if at least one received data packet of the specific type contains an indicia of RVU capability.

5. The test device of claim 4, wherein the specific type of data packet is an M-SEARCH packet.

6. The test device of claim 4, wherein the test device is a cable/data network interface device.

7. A test device for detecting whether or not a device is RVU capable, including:
    (a) network interface circuitry configured to be coupled to a device to be tested; and
    (b) receiver circuitry configured for receiving data packets from the device to be tested, determining if any of the received data packets are of a specific type, and indicating if at least one received data packet of the specific type contains an indicia of RVU capability.

8. The test device of claim 7, wherein the specific type of data packet is an M-SEARCH packet.

9. The test device of claim 7, wherein the test device is a cable/data network interface device.

10. A method for detecting whether or not a device is RVU capable, including:
(a) transmitting a first data packet type to a device to be tested;
(b) receiving a second data packet type from the device to be tested, the second data packet type containing an address to a data structure in the device to be tested;
(c) reading the data structure from the device to be tested; and
(d) indicating if the read data structure contains an indicia of RVU capability.

11. The method of claim 10, wherein the first data packet type is an M-SEARCH packet, and the second data packet type is an M-NOTIFY packet.

12. A test device for detecting whether or not a device is RVU capable, including:
(a) a network interface configured to be coupled to a device to be tested;
(b) a processor programmed to transmit a first data packet type to the device to be tested; receive a second data packet type from the device to be tested, the second data packet type containing an address to a data structure in the device to be tested; read the data structure from the device to be tested; and indicate if the read data structure contains an indicia of RVU capability.

13. The test device of claim 12, wherein the first data packet type is an M-SEARCH packet, and the second data packet type is an M-NOTIFY packet.

14. The test device of claim 12, wherein the test device is a cable/data network interface device.

15. A test device for detecting whether or not a device is RVU capable, including:
(a) network interface circuitry configured to be coupled to a device to be tested;
(b) transmitter circuitry configured for transmitting a first data packet type to a device to be tested; receiving a second data packet type from the device to be tested, the second data packet type containing an address to a data structure in the device to be tested; reading the data structure from the device to be tested; and indicating if the read data structure contains an indicia of RVU capability.

16. The test device of claim 15, wherein the first data packet type is an M-SEARCH packet, and the second data packet type is an M-NOTIFY packet.

17. The test device of claim 16, wherein the test device is a cable/data network interface device.

* * * * *